Dec. 14, 1937.  C. E. JOOS ET AL  2,101,908
METHOD OF AND APPARATUS FOR TREATING WATER
Filed July 17, 1935  2 Sheets-Sheet 1
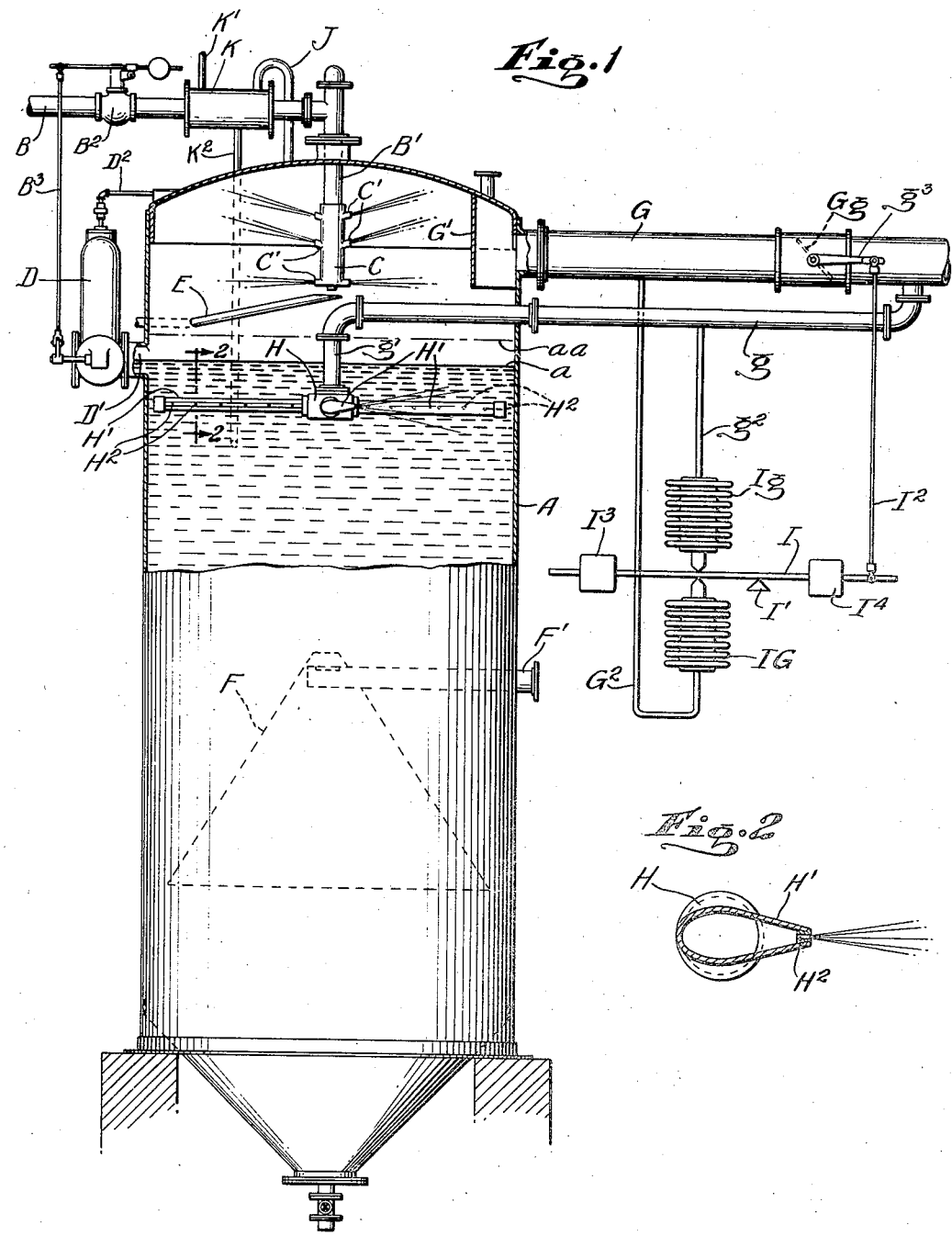
INVENTOR
GEORGE H. GIBSON
CHARLES E. JOOS
BY
John E. Hubbell
ATTORNEY

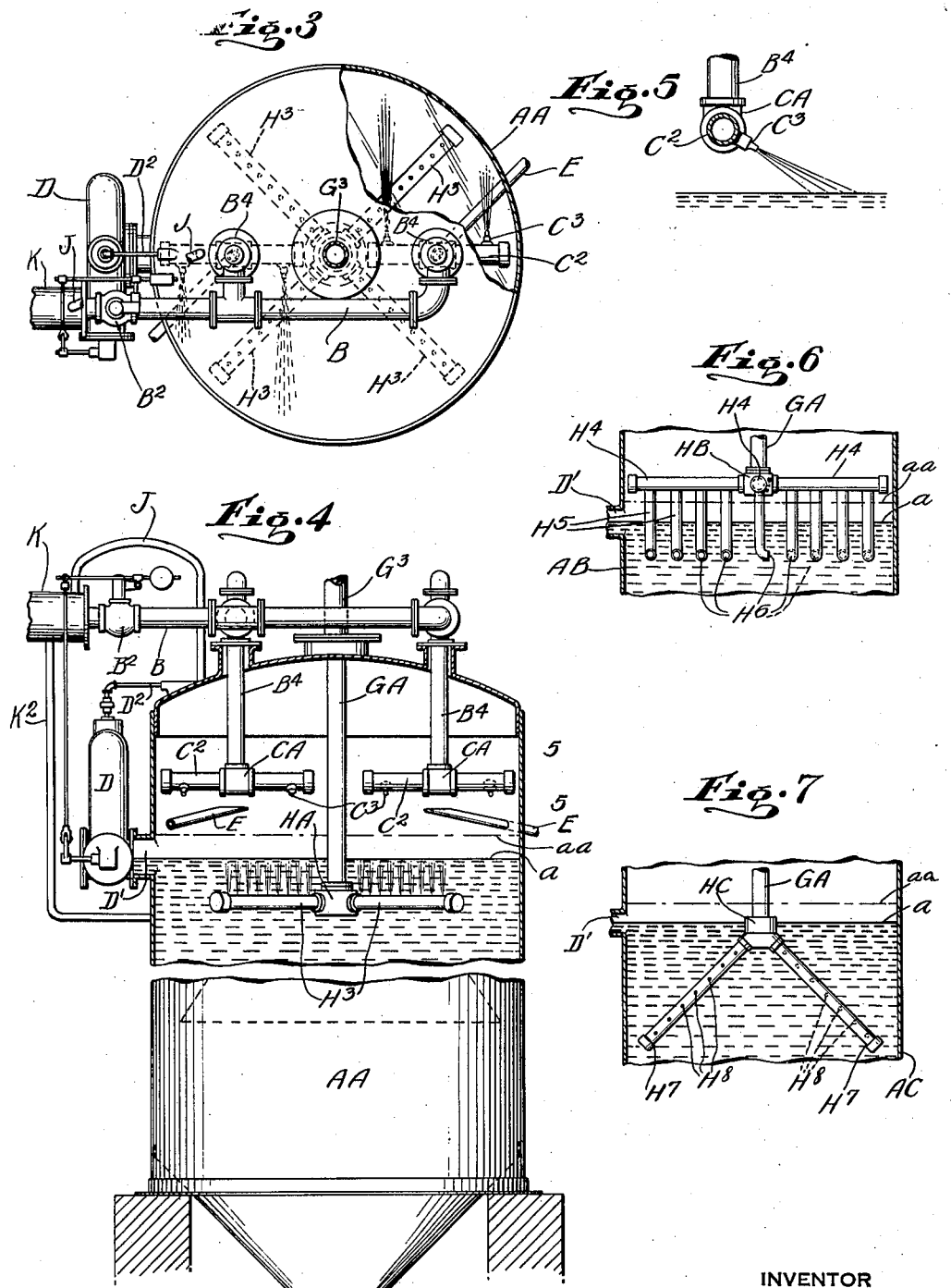

Patented Dec. 14, 1937

2,101,908

UNITED STATES PATENT OFFICE 2,101,908

METHOD OF AND APPARATUS FOR TREATING WATER

Charles E. Joos, Philadelphia, Pa., and George H. Gibson, Upper Montclair, N. J., assignors to Cochrane Corporation, Philadelphia, Pa., a corporation of Pennsylvania Application July 17, 1935, Serial No. 31,832

10 Claims. (Cl. 210—14)

The general object of the present invention is to provide improved methods of and apparatus for water treatment of the type in which the water treated is passed through a pool or a body of water in a tank or treatment vessel, and in which steam is injected into the said body or pool of water. The described treatment of water effects an intimate and repeated contact of the water particles with steam, which is desirable in heating and deaerating water, and when effected in the manner hereinafter described, is of particular utility in the so-called hot process of water softening.

In general, any such treatement involves some heating of the water treated, which is desirably effected as the water is sprayed or fed through a steam space above the body or pool of water into which steam is injected. To effect such water heating, part of the steam used may be introduced directly into said steam space while the remainder of the steam is injected into the water, or all of the steam used may be injected into the body or pool of water. In either case, the water will ordinarily be heated approximately to its final temperature as it passes through said steam space, and the bulk of the steam injected into the pool will not be condensed therein, but will pass up from the surface of the pool into said steam space wherein the condensation effected, wholly or mainly occurs.

Various forms of apparatus for heating and deaerating water by injecting steam into a pool or body of the water treated, have been proposed heretofore, and some use of such apparatus has been made. Our present invention is characterized, however, by its special provisions for effecting a desirably intimate and extended distribution of contact of the water with the injected steam. Our invention in its preferred form, is further characterized by improvements in the means for injecting steam into the pool of water so as to eliminate or minimize objectionable water hammer, particularly in starting the apparatus into operation, heretofore experienced in apparatus comprising means for injecting steam into a pool of water.

Our invention is characterized, in particular, by provisions made for giving a definite circulatory movement to the water in the pool or body into which the steam is injected. In a preferred form of the invention, the stream of steam injected into the water pool or body is divided into a plurality of jets so directed that their impact against the water in the pool will create a flow of the pool water in a predetermined direction above a vertical axis. Instead of using the energy of the stream of steam supplied to create such a circulatory movement of the water, that movement may be created by causing the stream of water fed into the pool through the steam space above it, to impact against the upper surface of the pool in a jet or jets so directed as to create the described movement of the water.

The circulatory movement of the water effected as above mentioned, contributes to the desired intimacy and extent of contact of water and steam, and is of especial utility when the water treated is subjected to a softening action by the addition thereto of chemical reagents used in the so-called hot process of water softening to form precipitates which settle out of the water, while the latter is in the pool or body into which the steam is injected. In such case, the circulatory movement of the water effected as described, not only insures a desirable uniformity in treatment of all portions of the entire body of water, but is of especial importance in that it contributes to the agglomeration of the precipitates into flocculent masses of relatively large size, with the result of a marked increase in the rapidity with which the precipitates settle out of the water. Such use of the invention has the important practical advantage, therefore, of making it possible to soften a given amount of water in apparatus less bulky, and of lower inherent construction cost than would otherwise be required to soften that amount of water.

The various features of novelty which characterize our invention are pointed out with particularity in the claims annexed to and forming a part of this specification. For a better understanding of the invention, however, the advantages possessed by it, and specific objects attained with its use, reference should be had to the accompanying drawings and descriptive matter in which we have illustrated and described a preferred embodiment of the invention.

Of the drawings:—

Fig. 1 is an elevation partly in section, of one form of water heating, deaerating, and softening apparatus;

Fig. 2 is a partial section on the line 2—2 of Fig. 1;

Fig. 3 is a plan view of a modified form of apparatus; and

Fig. 4 an elevation, partly in section of the apparatus shown in Fig. 3;

Fig. 5 is a partial section on the line 5—5 of Fig. 4;

Fig. 6 is a partial sectional elevation of another form of water heating, deaerating, and softening apparatus; and Fig. 7 is a partial sectional elevation of still another form of water heating, deaerating, and softening apparatus.

In the form of the invention illustrated in Figs. 1 and 2, A represents a tank for subjecting water to a hot process water softening treatment. As shown, the water to be treated is supplied to the tank A by a supply pipe B having a depending vertical branch B' extending centrally into the tank through the top wall of the latter, and connected at its lower end to a tubular spray body C. The latter is provided with a multiplicity of spray nozzles C', through which the water is sprayed into the upper steam space in the tank above the water level $a$, maintained in the tank, normally about as indicated in the drawings, though the water may be permitted to rise to the level $aa$. The height of water level is controlled by means of a valve $B^2$ in the pipe B, which is actuated through a connecting rod $B^3$ by a float in a float box D. The latter is external to the tank A, but communicates with the latter through a bottom connection D' opening to the tank A below the normal water level therein, and through an upper steam equalizing connection $D^2$ opening to the tank A above the maximum water level therein. A chemical purifying agent is supplied to the tank in any usual or suitable manner, as through the chemical supply pipe E. Purified water is withdrawn from the tank through a hood or collecting cone F, of the type customarily employed for withdrawing water from the settling tank of water softening apparatus. An outlet connection F' leads from the upper portion of the space within the member F through the wall of the tank A.

Part of the steam for heating and purifying the water is supplied to the steam space of the tank A by a pipe G. A baffle G' within the tank A prevents the stream of steam entering the latter through the pipe G from impinging against, and unduly deflecting, the jets of water discharged by the nozzles C'. The remaining portion of the steam used is supplied through a branch $g$ from the pipe G which extends through the tank wall above the water level and is connected by a depending branch $g'$ coaxial with the tank A to a manifold head H located below the water level. The manifold head H is provided with two or more tubular arms H' which extend radially away from the axis of the tank, and preferably are spaced symmetrically about that axis. As shown, there are four such arms. Advantageously and as shown, each tubular arm H' is flattened so that its horizontal width is greater than its vertical depth and is formed with a plurality of nozzle outlets $H^2$, each opening horizontally at one and the same side of the arm, so that the jet discharged by each nozzle is approximately tangential to a circle about the axis of the tank. The nozzle outlets $H^2$ of the different arms H' are so disposed that they all tend to create circular motion in the same direction about the vertical axis of the tank. As shown, the direction of that motion is counterclockwise as seen from the top of the tank.

For the best operative results, the velocity of water rotation about the axis of the tank should not be too low or too high. With apparatus of the character illustrated in Fig. 1, the water will be heated approximately to the temperature of steam at the pressure in the steam space of the tank A, regardless of the load, so long as the latter does not exceed the operative capacity of the apparatus. In consequence, as the load, or rate of water supply to the heater, is diminished, the amount of steam required and condensed is correspondingly diminished. The maintenance of a suitably high velocity of rotation of the water in the pool or body of water within the tank, requires a certain minimum velocity of steam discharge through the nozzle outlets $H^2$, and therefore a suitable excess of the pressure within the tubular arms H' above the pressure in the steam space above said pool. To suitably minimize variations in that pressure differential under varying load conditions, it may be advantageous, in some cases, at least, to provide suitable automatic control means, of which one form is shown in Fig. 1. The control means shown in Fig. 1, comprise a throttling valve $Gg$ in the portion of the pipe G between the tank A and the point at which the pipes G and $g$ are connected, and means for adjusting the valve $Gg$ as required to maintain an approximately constant excess of pressure in the pipe $g$ over the pressure in the portion of the pipe G at the outlet side of the valve $Gg$. The latter is shown as a pivoted valve having its operating arm $g^3$ connected by a link $I^2$ to a lever I, which is pivoted to turn about a fulcrum I'. The lever is subjected to the opposing action of devices $Ig$ and $IG$ located respectively above and below the lever, and each in the form of a bellows, having its end remote from the lever I stationary, and having its end adjacent the lever movable and engaging the latter. The interior of the bellows element $IG$ is connected by a pipe $G^2$ to the portion of the pipe G between the tank A and the throttling valve $Gg$. The bellows $Ig$ is connected to the pipe $g$ by pipe $g^2$. Counterweights $I^3$ and $I^4$ adjustably mounted on the arms of the lever I, permit of adjustment of the pressure differential which the valve tends to maintain, and adjustment of the valve inertia and sensitivity.

Air and other gases mixed with uncondensed vapors escape from the steam space of the tank A through a vent pipe J, which ordinarily and preferably leads to a vent condenser K which is cooled by the water passing through the supply pipe B. The condenser K has a vent outlet K' discharging into the atmosphere and has a water outlet $K^2$ which may discharge into the tank A below the water level in the latter.

In the form of the invention shown in Figs. 3, 4, and 5, the tank AA may be similar to the tank A of the construction first described, and deliver purified water through a similar hood F. All of the steam supplied to the tank AA is sprayed into the pool or body of water therein, below the normal water level, which is maintained as in the construction first described. The steam supply provisions for the tank AA comprise a vertical steam supply pipe GA coaxial with the tank and extending into the latter through its top wall. The pipe GA is connected at its lower end to a submerged manifold header HA provided with a plurality of radial arms $H^3$ which differ from the arms H' of the device first described, in that they all discharge steam upwardly so that the steam so discharged has no tendency to give the water circular motion about the axis of the tank. Such a circular motion is given to the water, however, by the impingement against the upper surface of the body of the water to be treated which is delivered into the steam space of the device AA through nozzles $C^3$ in jets suitably directed for the purpose.

As shown in Figs. 3 and 4, the water supply pipe B is provided with two depending branches $B^4$ extending downward into the steam space of the tank AA through the top wall of the latter at opposite sides of the tank axis. Each branch pipe $B^4$ is connected at its lower end to a manifold header CA which has two diametrically opposed arms $C^2$. The four arms are all in alignment as shown. Each arm $C^2$ is provided with one or more discharge nozzles $C^3$, each delivering a jet extending radially or approximately radially away from the axis of the corresponding arm $C^2$ and downwardly inclined so that the jet impinges against the surface of the subjacent body of water at an angle to the horizontal generally as shown in Fig. 5.

As shown, each arm $C^2$ is provided with a single nozzle $C^3$. The nozzles carried by the two arms $C^2$ connected to one header CA are directed away from one side, and the nozzles supported by the arms connected to the other manifold header CA are directed away from the other side of a vertical plane including the axes of the various arms $C^2$. In consequence, each jet, by its impingement on the subjacent body of water, tends to give the latter movement in the counter-clockwise direction about the vertical axis of the tank, as seen in plan in Fig. 3.

In the form of the invention shown in Fig. 6, the tank AB may be supplied with water to be treated and may deliver purified water as in the arrangement shown in Fig. 1, while as in Figs. 3 and 4, all of the steam used is supplied by a pipe GA. In Fig. 6, the pipe GA has its lower end connected to a manifold header or body HB, which with its horizontal radial tubular arms $H^4$ are located above the water level in the tank. Each of the arms $H^4$ is provided with one or more, four as shown, depending tubular branches $H^5$ which extend down into the subjacent body of water. Each branch $H^5$ is provided at its lower end with a discharge nozzle or outlet $H^6$ discharging steam into the water in a direction which is generally horizontal, and approximately tangential to a corresponding circle about the vertical axis of the tank. The nozzles $H^6$ receiving steam from the different arms $H^4$ are so relatively disposed that the jets discharged by all of the nozzles $H^6$ contribute to circular motion of the body of water in the tank, in the same direction about the vertical axis of the tank.

In the form of our invention illustrated in Fig. 7, the tank AC may receive water to be treated and deliver treated water as in the arrangement shown in Fig. 1, and as in the arrangements shown in Figs. 1, 4, and 6, all of the steam used in treating the water, is injected into the tank below the water level therein. As shown in Fig. 7, the steam is supplied by a central vertical pipe GA to the lower end of which a manifold or header HC is connected. The header HC is advantageously located adjacent the water level and has connected to it a plurality of tubular arms $H^7$. As shown there are two arms $H^7$ located at opposite sides of the axis of the tank AC, and the axes of both arms $H^7$ are in the same vertical plane including the tank axis. Each arm $H^7$ is inclined downwardly away from the water level and away from the tank axis, and is provided with a plurality of distributed outlets $H^8$ which open at different distances below the water level in a direction generally horizontal, and tangential to circles about the axis of the tank. The outlets $H^8$ of one arm $H^7$ face in a direction opposite to that in which the outlets of the other arm $H^7$ face, so that all of the jets discharged, contribute to the production of motion circularly about the axis of the tank of the water therein, in the counter-clockwise direction as viewed from the top of the tank.

As will be apparent from the foregoing, all of the forms of apparatus illustrated are characterized by provisions whereby the impact of the water treated, or of the steam with which the water is treated, on the pool of water within the settling tank, gives a circulatory motion to the water in the pool, with the result of increasing the extent and intimacy of contact of the different particles of water passing through the pool with the steam injected into the latter.

All of the forms of the apparatus illustrated, except that shown in Figs. 3, 4, and 5, are characterized by special provisions for eliminating or minimizing the tendency to water hammer which is a characteristic disadvantage of prior apparatus in which steam is injected into a body or pool of water under conditions usually prevailing when such apparatus is started into operation, and which may prevail under certain load fluctuation conditions. Such water hammer may develop whenever a body of steam is trapped in a conduit or chamber by water cold enough to effect a rapid condensation of the trapped steam. In such case, the inevitably rapid condensation of the trapped steam creates a rush of water to fill the space exhausted by the condensation of the steam, and the kinetic energy of the water set in motion, which must be wholly or largely absorbed by the conduit or chamber walls when the exhausted space fills with water and the motion of the latter is checked, subjects those walls to large stresses and may result in serious structural injuries.

As previously indicated, in respect to the matter of water hammer, the form of apparatus shown in Figs. 3, 4, and 5 does not differ significantly from the prior art. In starting such apparatus into operation, with the tubular arms $H^3$ filled with water at a temperature appreciably below the temperature of the steam supplied through the pipe GA, the rush of steam into the arms $H^3$, with the resultant expulsion of some of the water therein through the outlet orifices and the condensation of the entering steam, produces a rapid water movement and turbulence in the hollow arms, which almost inevitably results in trapping bodies of steam in the arms $H^3$ at variable points along their lengths, and resultant water hammer, as those trapped bodies of steam are condensed almost instantaneously. In stable operation, after the water in the pool is heated approximately to the temperature of the steam, and the arms $H^3$ are wholly or largely emptied of water, the tendency to water hammer does not exist, but it may recur if the load on the apparatus, fluctuates greatly, and will inevitably recur when the apparatus is restarted into operation following a period of non-operation during which the tubular arms $H^3$ fill with water colder than the steam supplied in restarting the apparatus.

With the horizontally flattened form of the arms H' of Figs. 1 and 2, and the location of the outlet orifices $H^2$ along the edges of the flattened arms, the tendency to water hammer is greatly reduced, since in starting the apparatus into operation, a condition is quickly reached in which all of the water then remaining in each arm H' is below the level of the orifices $H^2$, so that the steam may pass through the wide steam space above the water in the arm to the orifices H² with little or no tendency to steam trapping movement of the water in the lower portion of the arm.

In the form of apparatus shown in Fig. 6, there is practically no tendency to the steam trapping action resulting in water hammer, since the arms H⁴ contain no water, and the inrush of steam into the upper ends of the vertically disposed pipe branches H⁵ drives the water bodily out of those branches. The form of apparatus shown in Fig. 7, is also substantially free from any water hammer tendency, as the water in each branch H⁷ in starting, acts like a piston which is advanced by the inrushing steam to successively uncover the ports H⁸ located at different levels.

While in accordance with the provisions of the statutes, we have illustrated and described the best forms of embodiment of our invention now known to us, it will be apparent to those skilled in the art that changes may be made in the forms of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. In the hot process of water softening, the method which consists in passing the water and chemical precipitating material for softening the water, into a pool, and injecting jets of steam into said pool distributed at different radial distances from a vertical axis passing centrally through said pool with such directions as to create a circulatory movement to substantially all of the water in the upper portion of said pool about said vertical axis whereby the water movement contributes to the formation of flocculent precipitate masses large enough to settle rapidly out of the water.

2. In the hot process of softening water passed through a pool in which precipitates formed in the process may separate out of the water by sedimentation, the method of hastening sedimentation which consists in injecting steam into the water in said pool in jets distributed at different radial distances from a vertical axis passing centrally through said pool so directed as to create a circulation of substantially all of the water in the upper portion of said pool about said vertical axis.

3. Apparatus for heating and scrubbing water with steam comprising a container, means for passing water to be treated into, and withdrawing treated water from said container, so as to maintain a body of water in the lower portion of said tank and a steam space above said body, and means for injecting steam into the body of water comprising steam supply piping extending down into said body and formed with outlets below the top of said body and each receiving steam through a portion of said piping above the outlet until the steam has depressed the water level in said piping portion at least to the level of said outlet, said outlets being distributed circumferentially about and at different radial distances from the vertical central axis of said container and being adapted to discharge steam jets so directed that the different jets all tend to create circulatory movement of the water in the same direction about said axis.

4. Apparatus for heating and scrubbing water with steam comprising a container, means for passing water to be treated into and withdrawing treated water from said container so as to maintain a body of water in the lower portion of said tank and a steam space above said body, and means for injecting steam into the body of water comprising steam supply pipes extending down into said body and each inclined downwardly away from the horizontal and from the vertical axis of said container, and each formed with outlets at different levels below the top of said body.

5. Apparatus for heating and scrubbing water with steam comprising a container, means for passing water to be treated into and withdrawing treated water from said container so as to maintain a body of water in the lower portion of said tank and a steam space above said body, and means for injecting steam into the body of water comprising steam supply pipes extending down into said body and each inclined downwardly away from the horizontal and from the vertical axis of said container, and each formed with outlets at different levels below the top of said body, said outlets being so horizontally directed that the steam jets discharged through said outlets cooperate to create flow of the water in said body, about a vertical axis.

6. Hot process water softening apparatus comprising a container, means for spraying water to be treated into the upper portion of the container and for withdrawing treated water therefrom so as to maintain a body of water in the lower portion of said container, means for injecting steam into said body in jets distributed at different radial distances from a vertical axis passing centrally through said container and so directed that each tends to give a circulatory motion in the same direction about said vertical axis to the water in the upper portion of said body, and means for withdrawing from the upper portion of said container uncondensed steam and gases separating from the water.

7. Hot process water softening apparatus comprising a container, means for feeding water into, and means for withdrawing water from said container to maintain a body of water in the lower portion of said container, said feeding means including provisions for discharging the water fed into the upper portion of the container in jets, means for injecting jets of steam into the upper portion of said body, the last mentioned jets being distributed at different radial distances from the vertical central axis of the container and being so directed that each impacts against the water in said body so that all of said jets tend to give circulatory motion to the water in the same direction about said vertical axis, means for adding a chemical reagent to the water treated in said chamber, and means for withdrawing from the upper portion of the container uncondensed steam and gases separating from the water passing through the container.

8. Hot process water softening apparatus comprising a container, means for feeding water into and means for withdrawing water from said container to maintain a body of water in the lower portion of said container, said feeding means including provisions for discharging the water fed into the upper portion of the container in jets, said water withdrawing means comprising a conical collector axially disposed in said body of water, means for injecting jets of steam into the upper portion of said body, the last mentioned jets being distributed at different radial distances from the vertical central axis of the container and so impacting against the upper portion of water in said body that the different jets all tend to give a circulatory motion thereto in the same direction about said vertical axis, means for adding a chemical reagent to the water treated in said chamber, and means for withdrawing from the upper portion of the container uncondensed steam and gases separating from the water passing through the container.

9. Apparatus for heating and scrubbing water with steam, comprising a container, means for passing water to be treated into and withdrawing the treated water from said container so as to maintain a body of water in the lower portion of the container and a steam space above said body, and means for giving movement to substantially the entire upper portion of said body of water about a vertical axis passing centrally through said body, comprising means for passing steam into the upper portion of said body of water in horizontal jets distributed at different radial distances from said axis and all tending to create circulatory movement of the water about said axis in the same direction.

10. Apparatus for heating and scrubbing water with steam, comprising a container, means for passing water to be treated into and withdrawing the treated water from said container so as to maintain a body of water in the lower portion of the container and a steam space above said body, and means for giving movement to substantially the entire upper portion of said body of water about a vertical axis passing centrally through said body, comprising means for passing steam into the upper portion of said body of water in horizontal jets distributed circumferentially about and at different radial distances from said axis and all tending to create circulatory movement of the water about said axis in the same direction.

CHARLES E. JOOS.
GEORGE H. GIBSON.